United States Patent [19]

Toyoda et al.

[11] Patent Number: 4,667,785
[45] Date of Patent: May 26, 1987

[54] PARKING BRAKE ARRANGEMENT FOR VEHICLES

[75] Inventors: Hidetoshi Toyoda, Asaka; Masaru Koishi, Wako, both of Japan

[73] Assignee: Honda Giken Kogyo Kabushiki Kaisha, Tokyo, Japan

[21] Appl. No.: 863,902

[22] Filed: May 16, 1986

[30] Foreign Application Priority Data

May 17, 1985 [JP] Japan .............................. 60-73086[U]
Dec. 28, 1985 [JP] Japan .......................... 60-204707[U]

[51] Int. Cl.$^4$ ............................................ B60K 41/24
[52] U.S. Cl. .................................. 192/13 A; 192/3 S;
74/477; 74/529; 74/532; 74/501 R
[58] Field of Search .................. 192/13 A, 13 R, 3 S;
74/551.8, 471 R, 475, 477, 529, 532, 501 B, 473 R

[56] References Cited

U.S. PATENT DOCUMENTS 3,845,847 11/1974 Camp ................................... 192/3 S
4,193,309 3/1980 Nagano .............................. 74/501 B Primary Examiner—George H. Krizmanich
Attorney, Agent, or Firm—Armstrong, Nikaido, Marmelstein & Kubovcik

[57] ABSTRACT

A parking brake device adapted to be attached to a vehicle including a clutch lever on a handlebar such as a three- or four-wheeled buggy, wherein a parking brake is arranged coaxially with respect to the clutch lever; a lock arm is provided, which is formed at its free end with a lock hole for holding a parking brake lever in its braking position; and upper and lower pins are respectively inserted into upper and lower pin holders of a slitted sleeve mounted on the parking brake lever. The upper pin is pushed to engage the lower pin with the clutch lever and rotate therewith the parking brake lever by manipulation of the clutch lever, so that the slit on the parking brake lever is advanced into the free end of the lock arm to hold the parking brake in its braking position by the upper pin fitted into the lock hole in the lock arm.

2 Claims, 13 Drawing Figures

PARKING BRAKE ARRANGEMENT FOR VEHICLES

FIELD OF THE INVENTION AND RELATED ART STATEMENT

The present invention relates mainly to a parking brake arrangement for a three- or four-wheeled buggy including a clutch lever on a handlebar.

Some three-wheeled buggies designed to run on a rough road such as a sandly place include a parking brake device making use of a clutch lever in addition to a brake device for front and rear wheels. One example of such a device is disclosed in Japanese Utility Model Laid-Open No. 57(1982)-60895. In accordance with the parking brake device disclosed therein, a parking brake lever having a pin to engage a clutch lever is rotatably supported on a shaft for the clutch lever. The engaging pin is forced down to operate the clutch lever and thereby engage that pin with the clutch lever for co-rotation of the parking lever. A lock member pivotally supported on the parking lever is rotated to lock it on a locking step of a holder attached to a handlebar, whereby the parking brake lever is held in its braking position, even after the operation of the clutch lever has been released. is held in its braking position, even after the operation of the clutch lever has been released.

With this device, however, it has been required not only to push the engaging pin and operate the clutch lever, but also to rotate the lock member for locking the engaging pin in place.

OBJECT AND SUMMARY OF THE INVENTION

In view of the foregoing, it is therefore an object of the present invention to provide an arrangement capable of holding a parking brake lever in a position where the parking brake is put on in such a simple manner that a clutch lever is gripped for operation, while giving a push to an engaging pin formed on the parking brake lever.

According to the present invention, this object is achieved by the provision of a parking brake arrangement for a vehicle, which includes a clutch lever rotatably supported on a holder attached to a handlebar, a parking brake lever provided on the clutch lever and rotatably supported coaxially with respect to said clutch lever, a lock arm fixed to said holder and provided at its free end with a lock hole for holding said parking brake lever in its braking position, a sleeve mounted on said parking brake lever including an upper pin holder, a lower pin holder and a slit for inserting the free end of said lock arm in between both said holders, an upper pin mounted within said upper pin holder and biased upwardly by a resilient member, and a lower pin mounted in said lower holder and biased upwardly by another resilient member, said upper pin including on its lower side face an inclined face for allowing said upper pin to move over the free end of said lock arm into engagement within said hole in said lock arm, and said lower pin having its lower end capable of projecting from the lower end of said lower pin holder into engagement with said clutch lever by pushing movement of said upper pin.

This arrangement operates as follows. The upper pin provided on the parking brake lever is pushed down to force down the lower pin by the upper pin and thereby projects the lower portion by the lower pin out of the lower pin holder. If the clutch lever is gripped for operation in this state, then the lower pin engages at the lower portion the inside face of the clutch lever, thereby rotating therewith the parking lever in the braking direction. Thereupon, the slit located between said both holders is admitted into the free end of the lock arm, and the upper pin within the upper pin holder is forced up, while coming into abutment upon the free end of the lock arm. The upper pin in the upper pin holder moves over the outer edge of the free end of the lock arm into engagement within the lock hole in the lock arm, so that the parking brake lever is maintained in its braking position.

Many other advantages, features and additional objects of this invention will become manifest to those versed in the art upon making reference to the detailed description and the accompanying sheet of the drawings on which preferred structural embodiments incorporating the principles of this invention are shown by way of illustrative example.

BRIEF DESCRIPTION OF THE DRAWINGS

FIG. 4 is a plan view thereof in its braking position, FIG. 5 is a sectional view taken along the line 5—5 of FIG. 3, FIG. 6 being a sectional view taken along the line 6—6 of FIG. 3, and FIG. 7 being a sectional view taken along the line 7—7 of FIG. 4.

Figure 1:
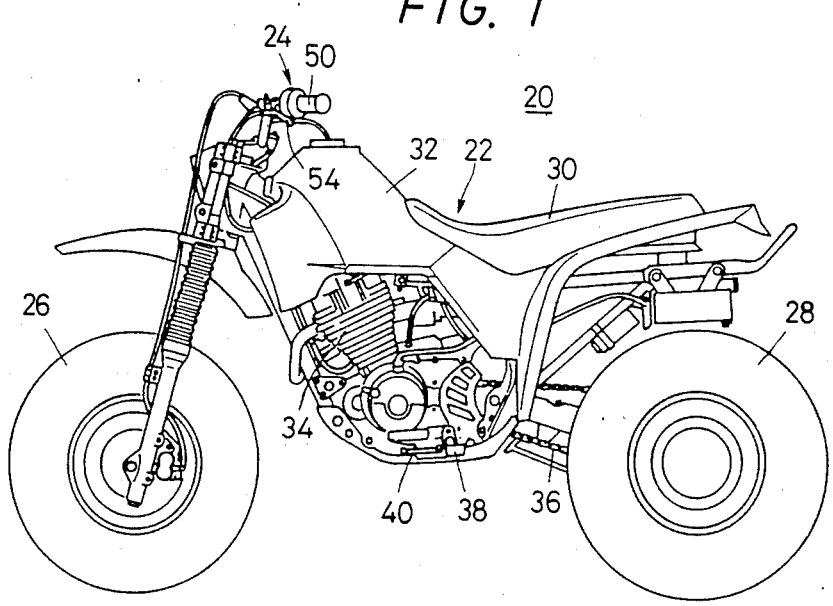
FIGS. 1 to 7 inclusive show one embodiment of the present invention, FIG. 1 being a front view of a three-wheeled buggy, FIG. 2 being a plan view thereof, FIG. 3 being a plan view of the parking brake device in its nonbraking position.

As will be seen from FIGS. 3 to 7 illustrating in detail the parking brake device 70, it includes a parking brake lever 72 disposed on the upper portion of the clutch lever 54 and supported rotatably by the shaft 56 common to said lever 54, and a lock arm 76 in the form of a flat sheet, which is fixed onto the upper face of the holder 52 by means of the shaft 56 and a screw 74. The lock arm 76 serves to hold the parking brake lever 72 at a position where the parking brake is operable or put on. The parking brake lever 72 is also connected with a parking brake cable 78 for operating a parking brake mechanism of a brake device (not shown) for the rear wheels 28 and 28.

The parking brake lever 72 is provided at the end with a sleeve 80 in the longitudinal direction. On a generally intermediate portion of the sleeve 80, it includes a slit 82 into which the free end of the lock arm 76 is insertable, when the parking brake lever 72 is rotated into the position where the parking brake is put on. Upper and lower pin holders 84 and 86 extend from the upper and lower portions of the slit 82 on said sleeve 80.

DETAILED DESCRIPTION OF PREFERRED EMBODIMENTS

The present invention will now be explained with reference to one preferred embodiment shown in FIGS. 1 to 7 inclusive, wherein it is applied to a three-wheeled buggy.

Figure 2:
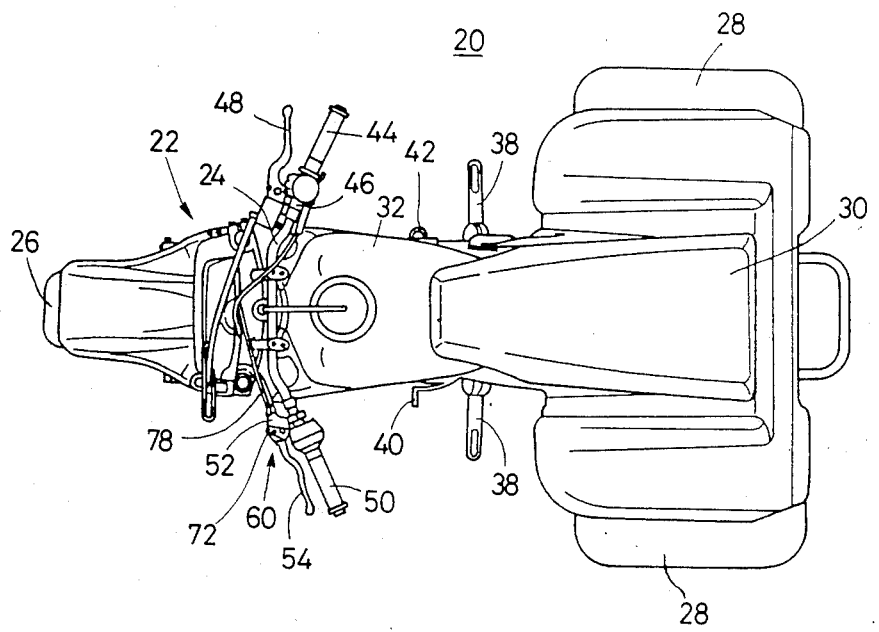
Figure 3:
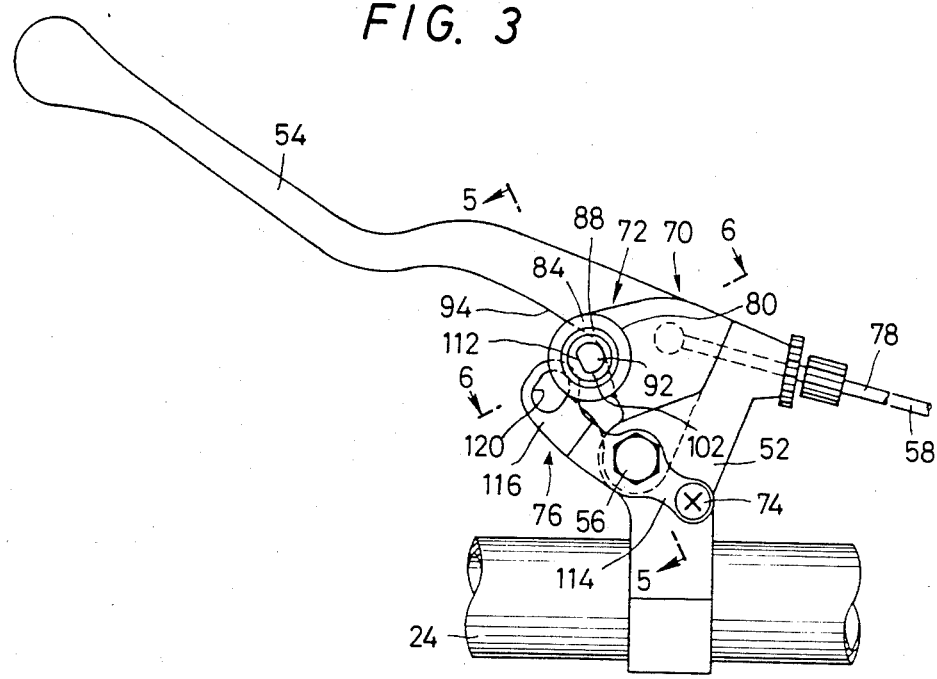
Figure 4:
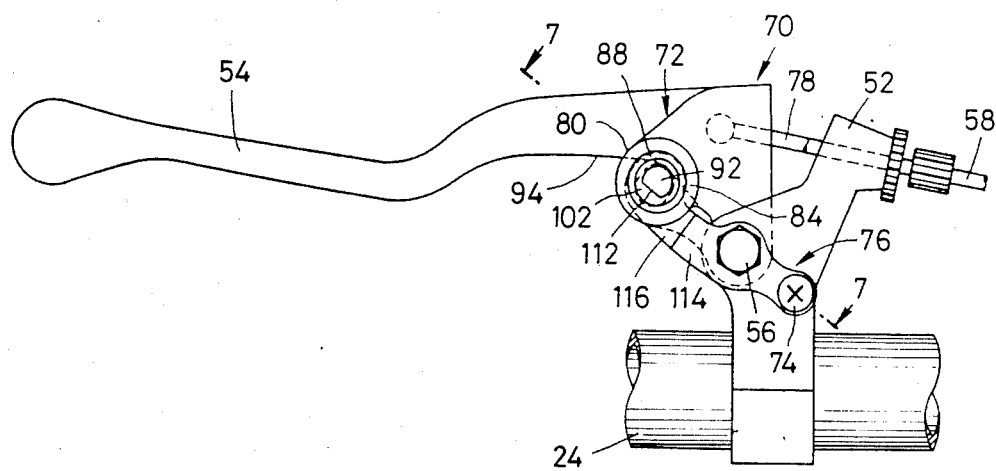

FIGS. 1 and 2 are front and plan views of a three-wheeled buggy. The three-wheeled buggy is shown generally at 20, and includes a body 22 having on its front portion a single wheel 26 steerable by a handlebar 24 and on its rear portion two wheels 28 and 28. The body 22 is also provided with a seat 30 on its upper portion, which includes on its front portion a fuel tank 32 which, in turn, includes on its lower portion an engine assembly 34 to form an off-road type of three-wheeled vehicle as a whole. A driving force from the engine 34 is transmitted to the rear wheels 28 and 28 by way of a chain 36.

The engine 34 is fixedly provided with bar steps 38 and 38 on its left and right lower portions. A change pedal 40 is arranged in front of the lefthand bar step 38, while a brake pedal 42 for the rear wheels is disposed in front of the righthand bar step 38. Inside of a righthand acceleration grip 44 of the handlebar 24, a brake lever 48 for the front wheel is rotatably mounted with respect to a holder 46 attached to the handlebar 24. Inside of a lefthand grip 50, the handlebar 24 is provided with a holder 52, on which a clutch lever 54 is rotatably supported by a shaft 56. The clutch lever 54 is connected with a clutch cable 58, through which a clutch device (not illustrated) is operated.

The holder 52 is provided with a parking brake device 70.

The upper and lower pin holders 84 and 86 are fitted therein with associated guide bushings 88 and 90. An upper pin 92 to engage the lock arm 76 is inserted into the guide bushing 88 of the upper pin holder 84, while a lower pin 96 to engage the inside face 94 of the clutch lever 54 is inserted into the guide bushing 90 of the lower pin holder 86. The pins 92 and 96 are wound therearound with resilient return springs 98 and 100, each in the form of a coil, and lock rings 102 and 104 are fitted into the upper ends of the guide bushings 88 and 90. In this arrangement, the upper and lower pins 92 and 96 are forced up to positions where they abut against the lock rings 102 and 104, whereby the upper end of the upper pin projects upwardly from the upper end of the guide bushing 88, while the lower end thereof is received in the upper pin holder 84.

The upper pin 92 includes on the lower portion an inclined face 110, which faces the free end of the lock arm 76. The upper pin 92 is also chamfered at 112 on the upper portion, where it engages the lock ring 102 to prevent any rotation of the upper pin 92. When the projecting portion of the upper end of the upper pin 92 is forced down against the biasing action of the return spring 98, the lower end of the upper pin 92 gives a push to the upper end of the lower pin 96, until the lower portion of the latter pojects from the lower end of the lower pin holder 86.

The lock arm 76 is constructed of a mount portion 114 fixed to the holder 52 by means of the shaft 56 and the screw 74, and an arm portion 116 connected at one end with said mount portion 114 and being flush with the slit 82 in the parking brake lever 72. At the other end of the arm portion 116, there is an oval lock hole 120 within which the upper pin 92 of the parking brake lever 72 engages.

Figure 5:
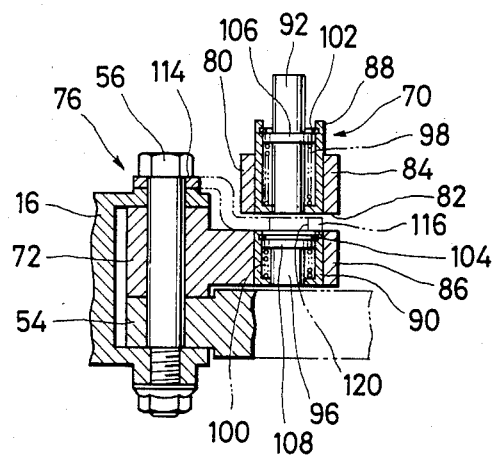
Figure 6:
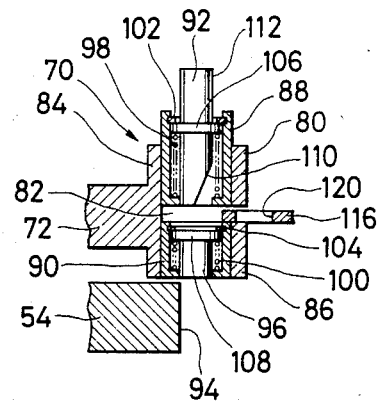
Figure 7:
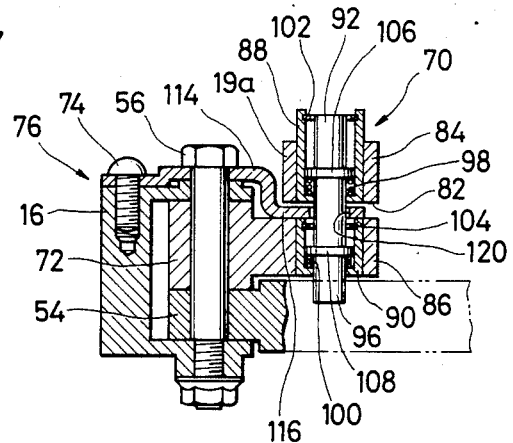

As mentioned in the foregoing, the upper and lower pins 92 and 96 of the parking brake lever 72 are normally biased upwardly by the forces exerted by the return springs 98 and 100, as illustrated in FIG. 5. Thus, operation of the clutch lever 54 is achieved only by rotation of said lever for clutching.

When the parking brake is used, a downward push is given to the projected upper end portion of the upper pin 92 to force down the lower pin 96 by the lower end of the upper pin 92 and thereby project the lower portion of the lower pin 96 out of the lower face of the lower pin holder 86. Operation of the clutch lever 54 in this state causes the projecting lower end portion of the lower pin 96 to engage the inside face 94 of the clutch lever 54, thereby rotating therewith the parking brake lever 72 in the operable or braking direction. Such rotation of the parking brake lever 72 causes the slit 82 in the parking brake lever 72 to enter the other end of the arm portion 116 of the lock arm 76. Said other end then abuts against the inclined face 110 of the upper pin 92 to force up the upper pin 92 against the biasing force of the return spring 98 and permit it to pass over the outer edge of said other end of the arm portion 116 into engagement within the lock hole 120, whereby the parking brake cable 78 is tracted to actuate the parking brake mechanism of the brake device for the rear wheels 28 for braking during parking. When the upper pin 92 passes over the outer edge of the other end of the lock arm 76, a push applied on the lower pin 96 by the upper pin 92 is temporarily released. However, the lower pin 96 remains projected out of the lower face of the pin holder 86 due to a frictional force produced by its engagement with the inside face 94 of the clutch lever 54. Since the upper pin 92 to engage within the lock hole 120 in the lock arm 76 is biased in the direction counter to the braking direction due to the biasing force of a return spring (not shown) for the parking brake cable 78, it is kept in engagement within the lock hole 120 by a frictional force applied on both sides thereof. Even after the operation of the clutch lever 54 has been relesed to restore it to the nonoperative or nonbraking position by the return spring for the cluch cable 58.

Furthermore, returning of the clutch lever 54 to the nonoperative or nonbraking position tends to make connection between the engine, not at work, and the transmission by way of clutching, thus assuring more satisfactory braking.

To put off such parking brake, the clutch lever 54 is manipulated to permit its inside face 94 to abut on the lower pin 96 projecting out of the parking brake lever 72, so that the lever 72 is somewhat rotated. Thereupon, the upper pin 92 is disengaged from the side of the lock hole 120, and is projected upwardly by the biasing force of the return spring 98 to disengage the parking brake lever 72 from the lock arm 76. Further, returning of the clutch lever 54 to the original position leads to returning of the lower pin 96 into the lower pin holder 86 and returning of the parking brake lever 72 to the original position by the return spring for the parking brake cable 78.

According to the instant embodiment, the parking brake can easily be put on in a one-handed manner, i.e., by gripping the clutch lever, while pushing the upper pin, and can readily be put off only by re-manipulation of the clutch lever.

Figure 8:
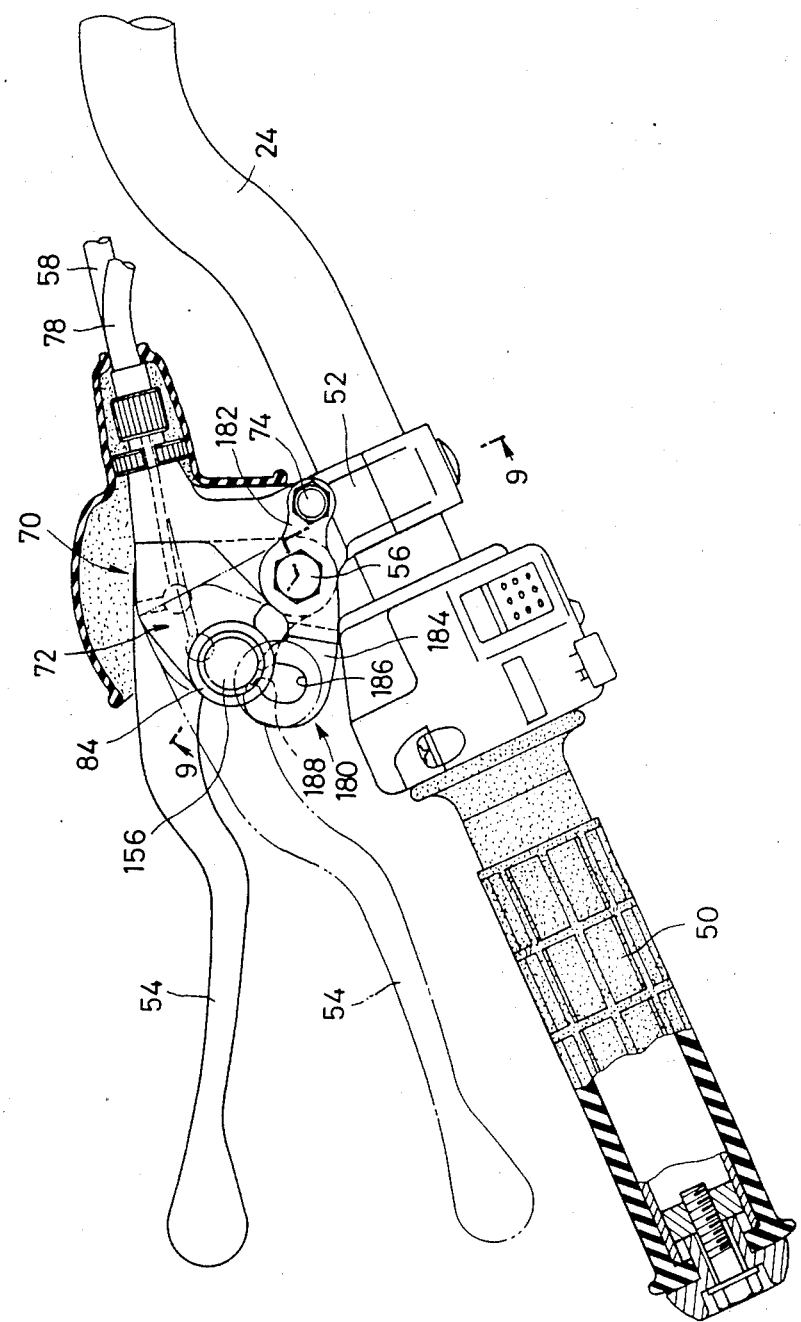
FIGS. 8 to 10 inclusive show another embodiment of the present inventin, FIG. 8 being a plan view of the parking brake device in its nonbraking position, FIG. 9 being a sectional view taken along the line 9—9 of FIG. 8, and FIGS. 10A-D being sectional views illustrating the same in its braking position.
Figure 9:
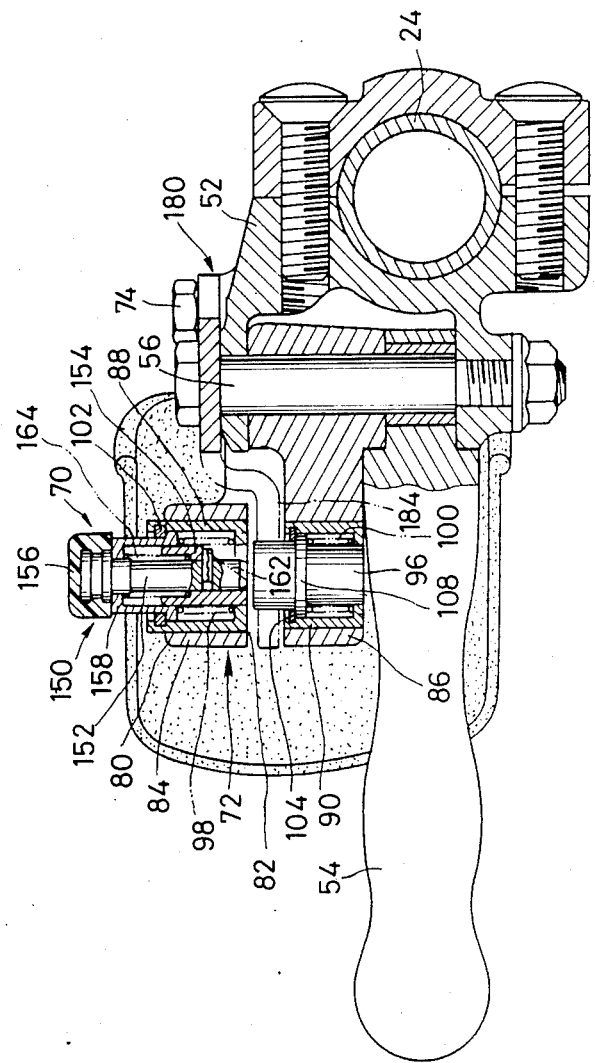

Another embodiment of the present invention will now be explained with reference to FIGS. 8 to 10 wherein like parts used in the first embodiment are indicated by like reference numerals.

In the second embodiment of the present invention to be described below, an upper pin 150 to be inserted into an upper pin holder 84 includes a pin 152 of a smaller diameter and a slide pin 154 fitted over said pin 152.

The smaller-diameter pin 152 is to force down a lower pin 96 at its lower end, and includes a push button 156 at its upper end projecting from the upper end of a guide bushing 88. On the lower face of the push button 156, there is locked the upper end of a guide sleeve 158 which extends downwardly. For vertical movement, this pin 152 is guided with respect to the guide bushing 88 of the upper holder 84 by a flange 160 mounted at the lower end of the guide sleeve 158. The smaller-diameter pin 152 is constantly biased upwardly under the biasing action of a return spring 98.

The slide pin 154 includes an inclined face 162 on its lower side in opposition to the free end of the lock arm 180. As mentioned above, the slide pin 154 is fitted over the lower portion of the smaller-diameter pin 152, and includes a return spring 164 between the slide pin 154 and the guide sleeve 158, which abuts against a stopper pin 166 provided thereon due to its biasing force. The aforesaid pins 152 and 154 are normally received within the upper pin holder 84 under the biasing action of the return springs 98 and 164.

The lock arm 180 includes a mount portion 182 and an arm portion 184 which are similar to the mount and arm portions 114 and 116 in the foregoing first embodiment. The arm portion 184 is provided at its free end with a lock hole 186 to engage the slide pin 154 and a guide groove 188 for guiding the smallerdiameter pin 152 into the lock hole 186.

In the arrangement as mentioned above, the upper and lower pins 150 and 96 of the parking brake lever 72 are constantly biased upwardly under the biasing action of the respective springs 98 and 100. Thus, operation of the clutch lever 54 is achieved only by rotation thereof for clutching.

When the parking brake is applied, a downward push is given to the push button 156 of the smaller-diameter pin 152 of the upper pin 150 projecting out of the upper face of the upper pin holder 26. Thereupon, the smaller-diameter pin 152 and the slide pin 154, from which downward restraint is now removed, go down into abutment against the upper face of the lower pin 96, thereby causing the smaller-diameter pin 152 to force down the lower pin 96, until the lower end thereof projects out of the lower face of the lower pin holder 86.

Figure 10A:
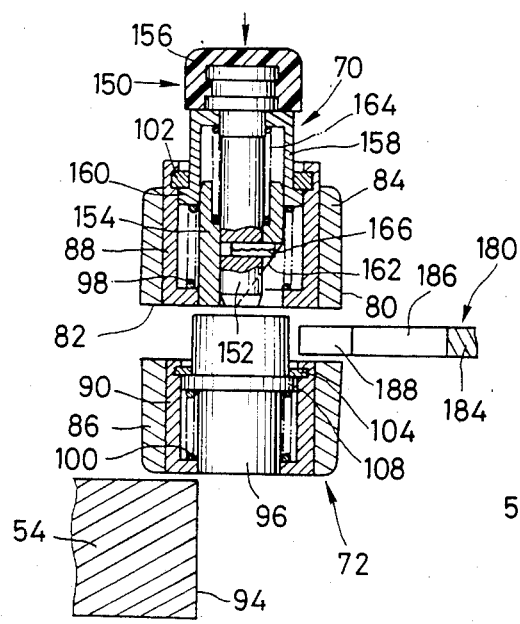
Figure 10B:
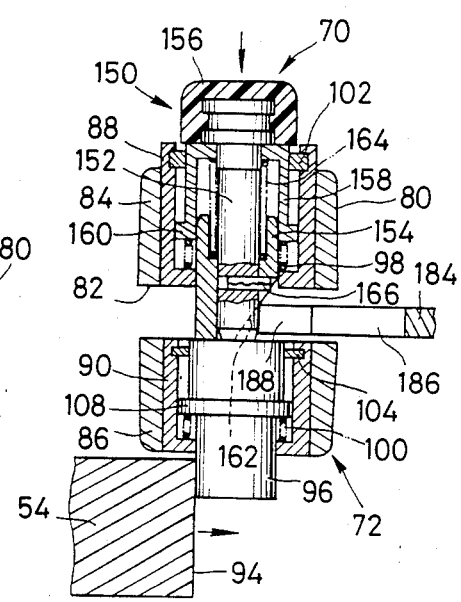
Figure 10C:
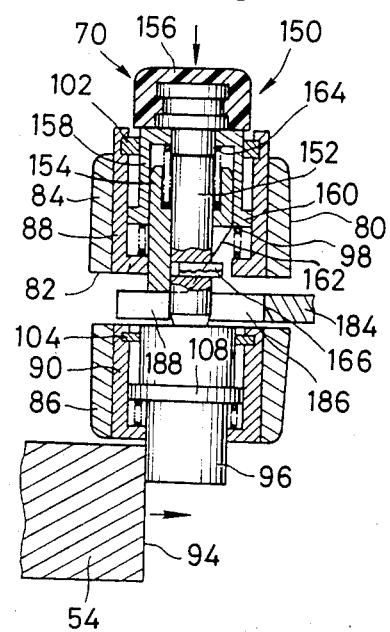
Figure 10D:
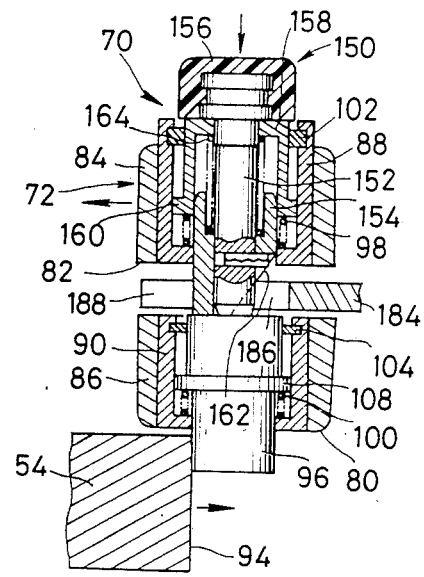

Subsequent operation of the clutch lever 54 causes engagement of the projecting lower end portion of the lower pin 96 with the inside face 94 of the clutch lever 54, thereby rotating therewith the parking brake lever 72 in the operative or braking direction (see FIGS. 10A and 10B).

In the parking brake lever 72 rotated into the position where the parking brake is put on, the lock arm 180 advances into a slit 82 in the lock arm 180, so that the slide pin 154 abuts against the free end of the lock arm 180, and is then forced up with its inclined face 162 against the biasing action of the return spring 164, so that the smaller-diameter pin 152 is admitted into the lock hole 186 along the guide groove 188. The slide pin 31 then passes over the outer edge of the lock arm 180, is freed of any upward push, and again descends under the biasing action of the return spring 164, until it is fitted into the lock hole 186 for parking braking (see FIGS. 10C and 10D).

Even after operation of the clutch lever 54 and pushing movement of the push button 156 have been removed, the lock arm 180 is biased by a return spring (not illustrated) for the parking brake cable 78 in the direction counter to the braking direction, so that engagement of the slide pin 154 within the lock hole 186 is maintained due to a frictional force occurring therebetween.

Returning of the clutch lever 54 to the nonoperative or nonbraking position also tends to make connection between the engine, not at work, and the transmission, thus assuring more satisfactory braking.

When the parking brake is put off, the clutch lever 54 is once manipulated to abut the inside face 94 thereof on the lower pin 96 projecting from the parking brake lever 72 and rotate the parking brake lever 72. The slide pin 154 is then disengaged out of the lock hole 186 to return the slide pin 154 and lower pin 96 into the associated pin holders 84 and 86.

According to this embodiment, whenever the upper pin 150 passes over the free end of the lock arm 180, the slide pin 154 is forced up. However, the smaller-diameter pin 152 is guided into the lock hole 186 by way of the guide groove 188, so that the lower pin 96 continues to be pushed by the smaller-diameter pin 152 without causing the latter to be re-forced upwardly, whenever the slide pin 154 passes over the outer edge of the lock arm 180.

It is to be understood that both the aforesaid embodiments have been described as being applied to a three-wheeled buggy, the invention is not limited thereto, and may be applied to any vehicle including a clutch lever attached to a handlebar.

Obviously, many modifications and variations of the present invention are possible in the light of above teachings. It is therefore to be understood that within the scope of the appended claims, the invention may be practiced otherwise than as specifically described.

What is claimed is:

1. A parking brake arrangement for a vehicle, which includes:
    a clutch lever rotatably supported on a holder attached to a handlebar,
    a parking brake lever rotatably supported coaxially with respect to said clutch lever,
    a lock arm fixed to said holder and provided at its free end with a lock hole for holding said parking brake lever in its braking position,
    a sleeve mounted on said parking brake lever and including an upper pin holder, a lower pin holder and a slit for inserting the free end of said lock arm in between both said holders,
    an upper pin mounted within said upper pin holder and biased upwardly by a resilient member, and
    a lower pin mounted in said lower holder and biased upwardly by another resilient member,
    said upper pin including on its lower side face an inclined face for allowing said upper pin to move over the free end of said lock arm into engagement within said hole in said lock arm, and
    said lower pin having its lower end capable of projecting from the lower end of said lower pin holder into engagement with said clutch lever by said movement of said upper pin.

2. A parking brake arrangement for a vehicle as defined in claim 1, wherein said upper pin includes a pin of a smaller-diameter pin, and a slide pin fitted over said smaller-diameter pin and having on its lower side face an inclined face for allowing said upper pin to move over the free end of said lock arm into engagement within said hole in said lock arm, and said lock arm is provided at its free end with a guide groove for guiding said smaller-diameter pin into said lock hole.

* * * * *